Mar. 6, 1923.

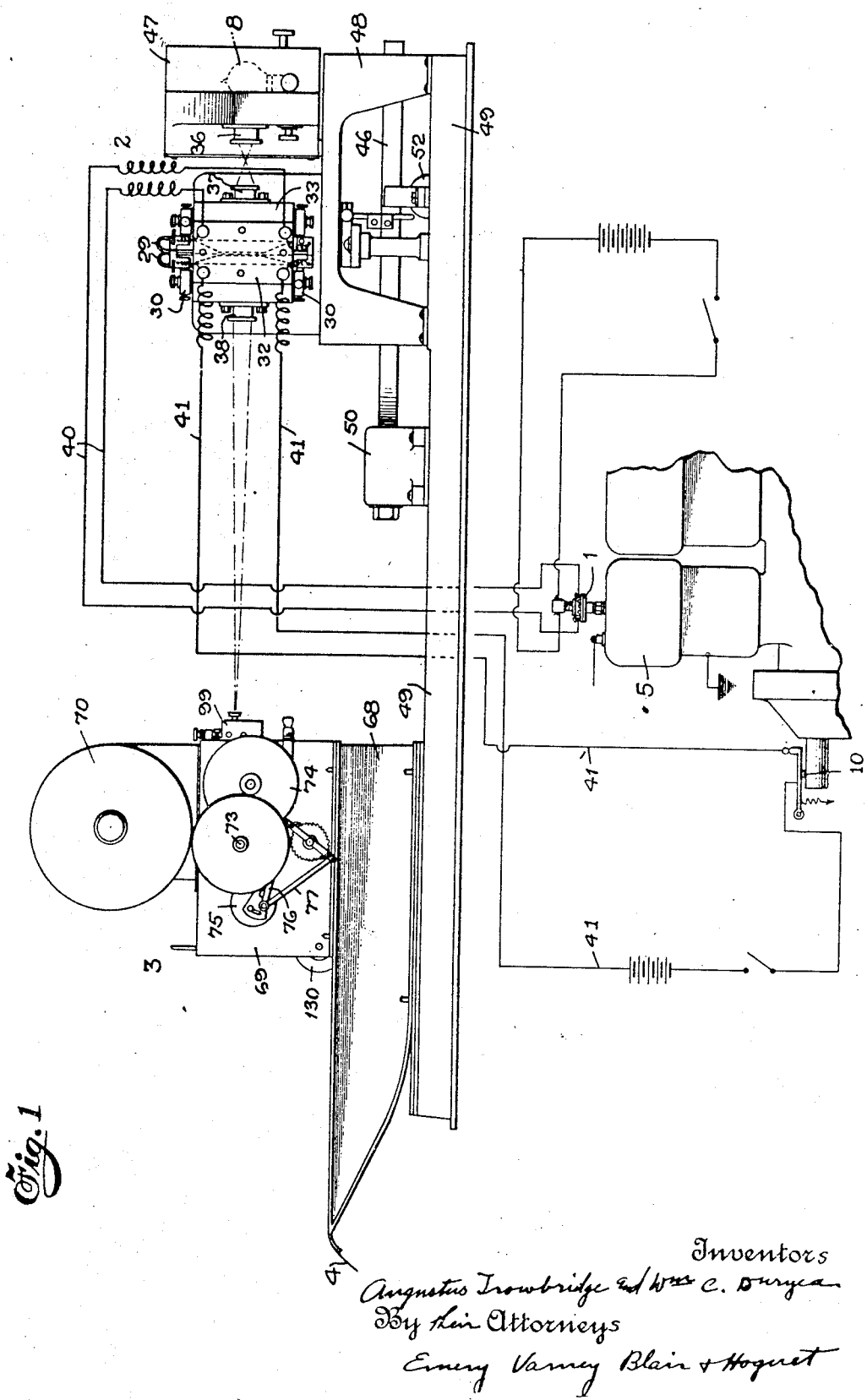

A. TROWBRIDGE ET AL

RECORDING INDICATOR

Filed Oct. 5, 1920

Inventors
Augustus Trowbridge and Wm. C. Duryea
By their Attorneys
Emery, Varney, Blair & Hoguet

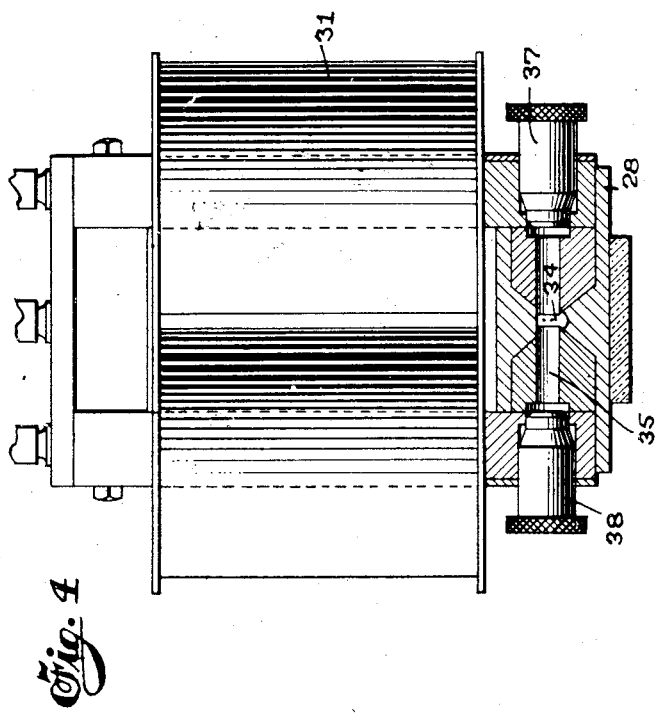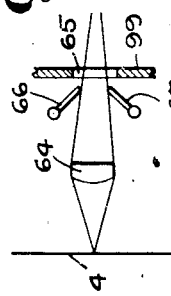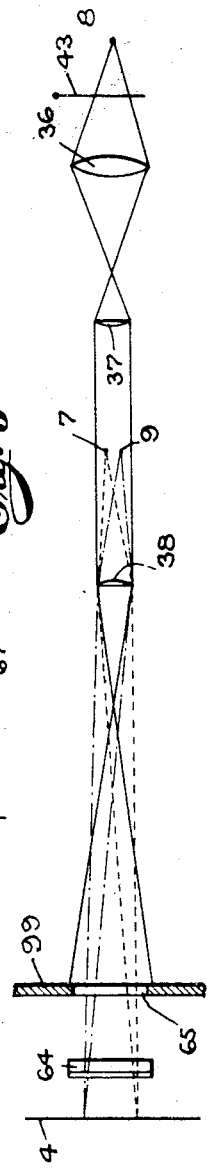

Mar. 6, 1923.
A. TROWBRIDGE ET AL
RECORDING INDICATOR
Filed Oct. 5, 1920          8 sheets-sheet 4
1,447,913
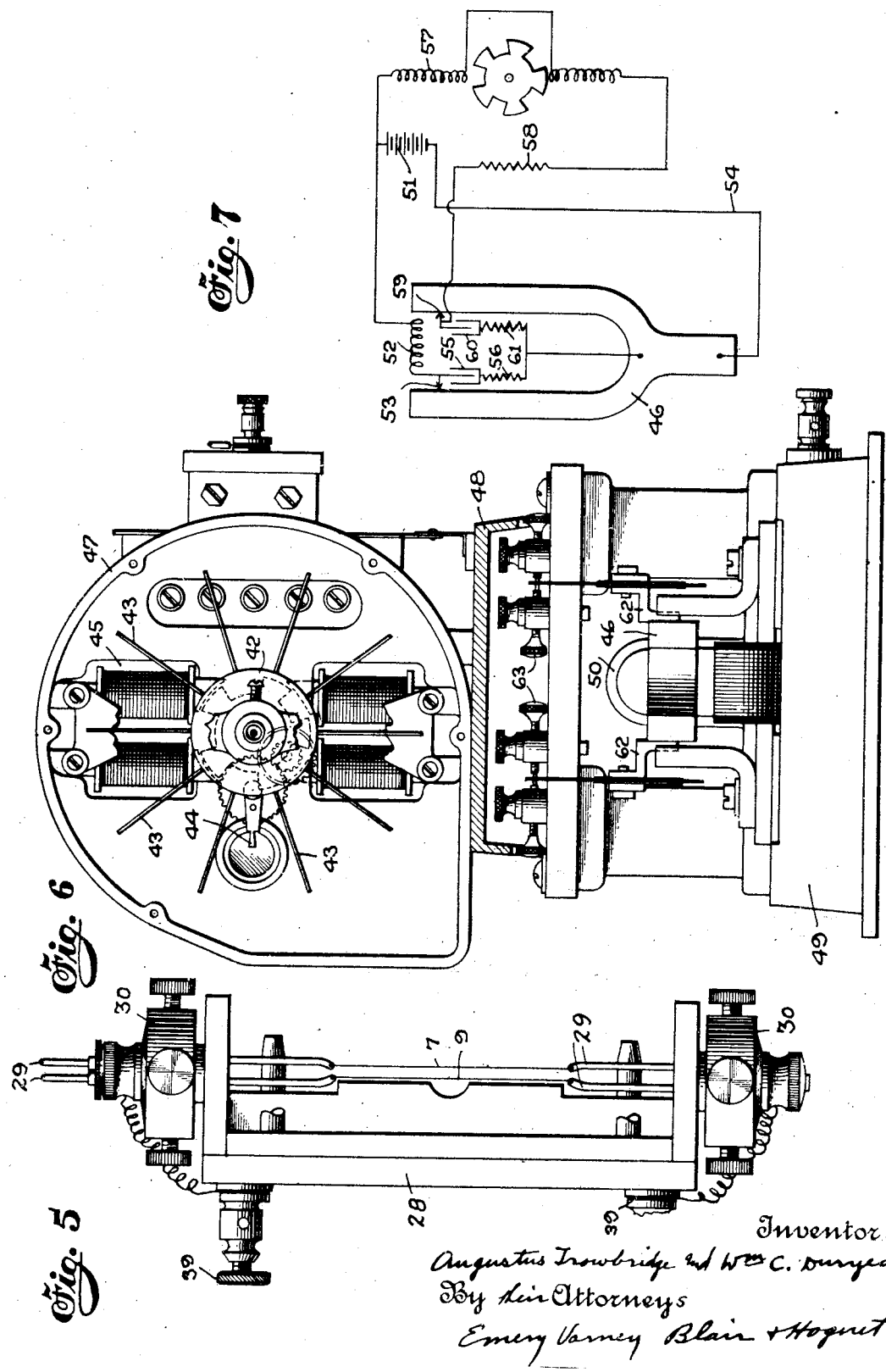
Inventors
Augustus Trowbridge and Wm. C. Duryea
By their Attorneys
Emery Varney Blair & Hoguet

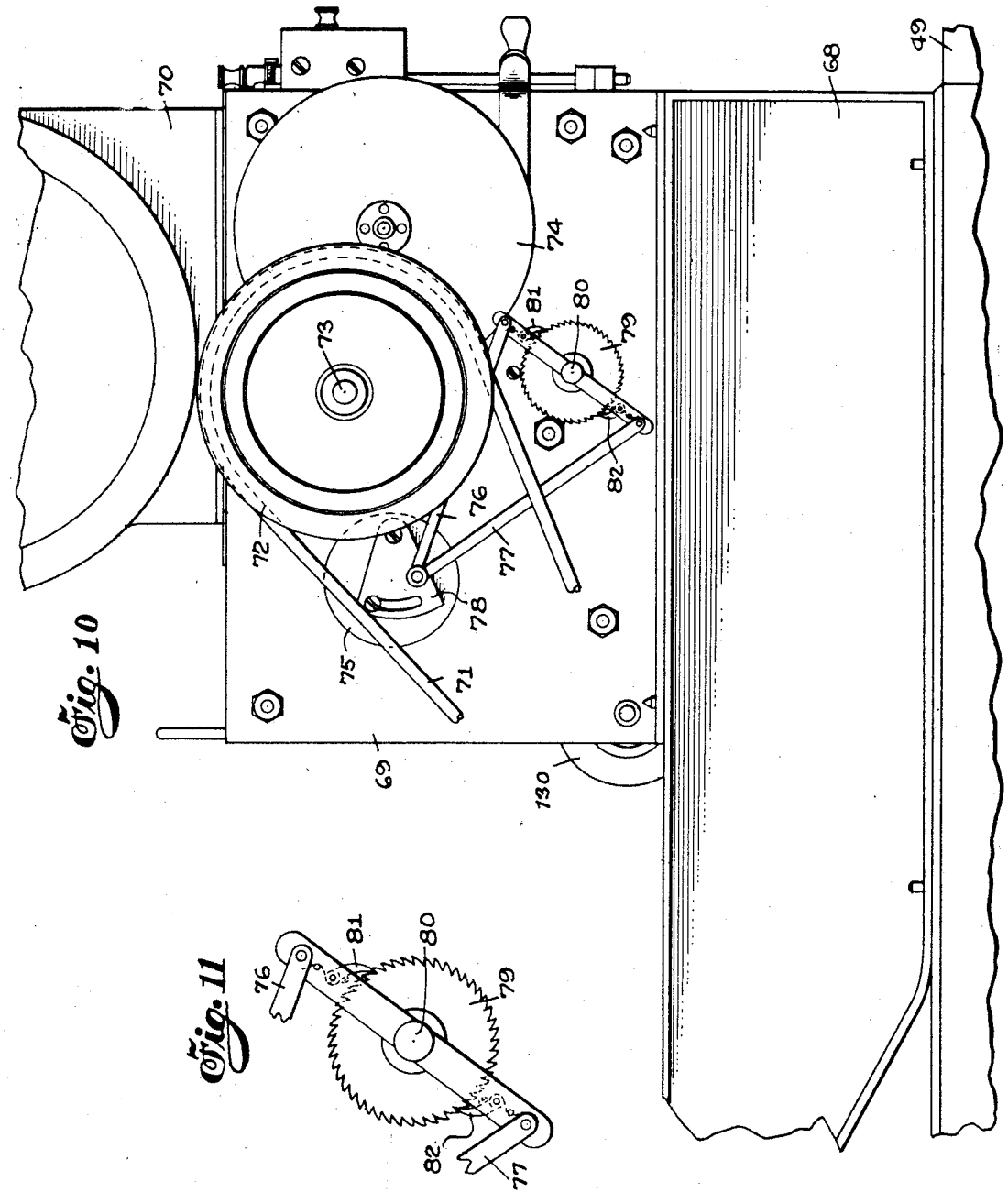

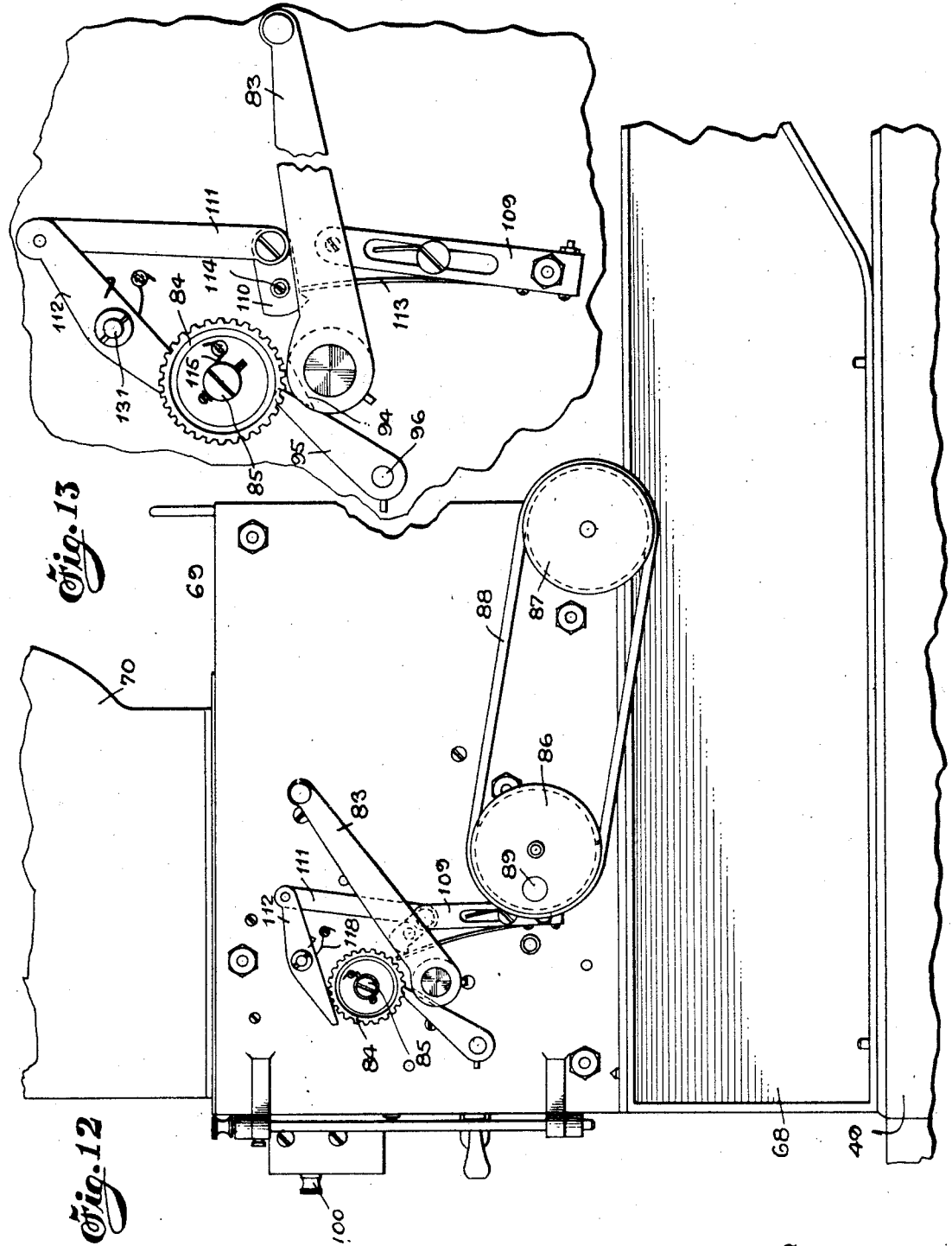

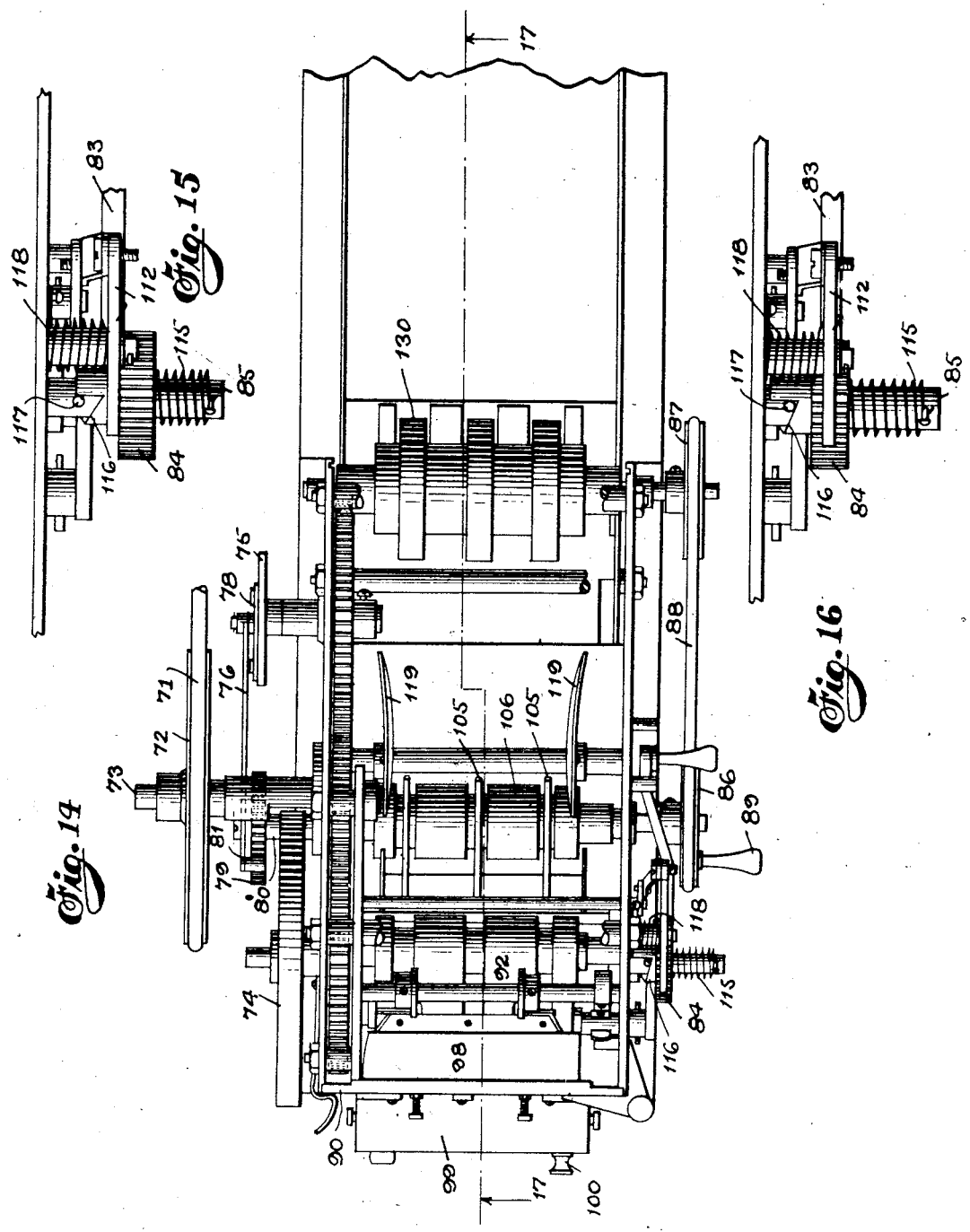

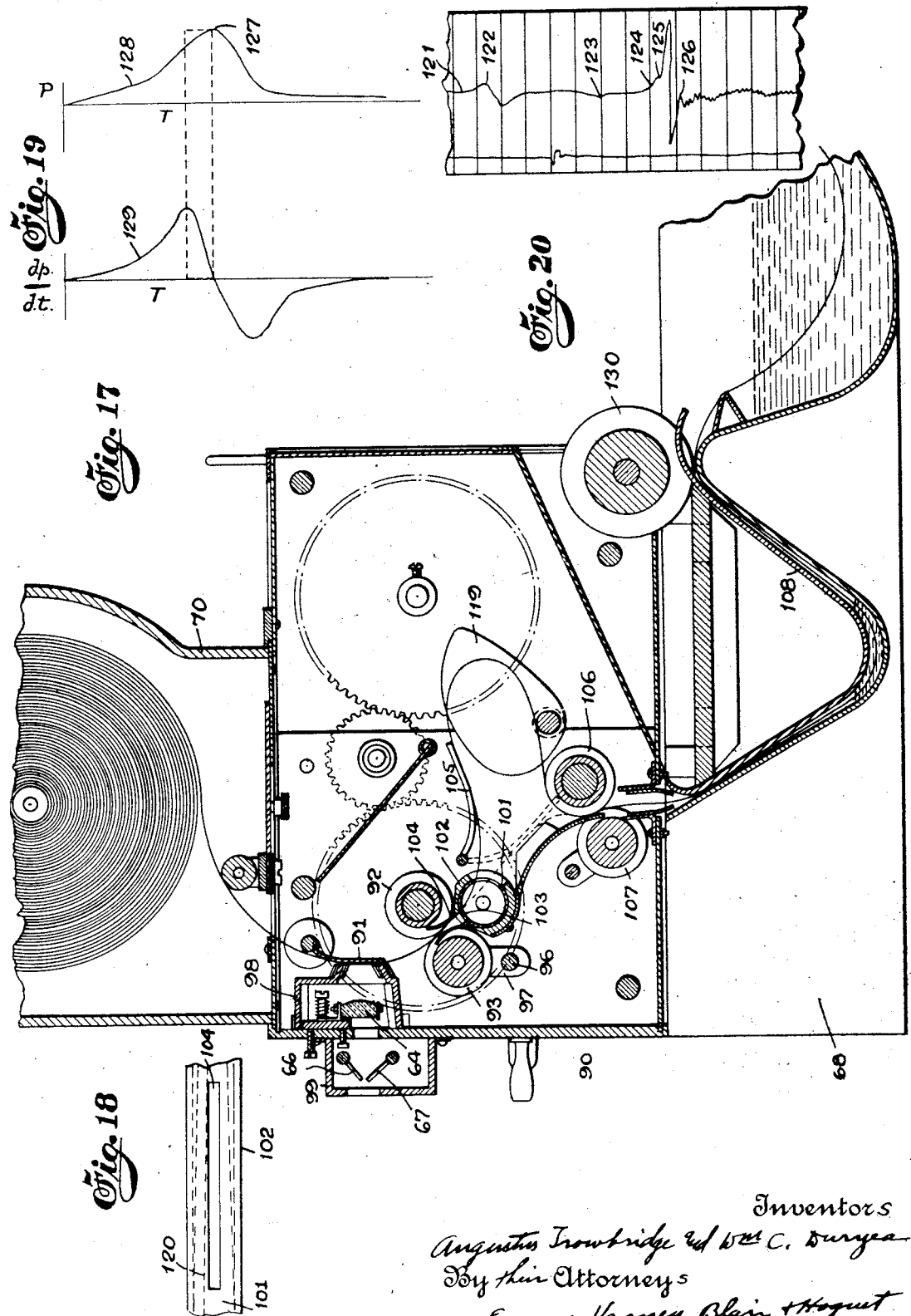

Patented Mar. 6, 1923.

1,447,913

UNITED STATES PATENT OFFICE.

AUGUSTUS TROWBRIDGE, OF WASHINGTON, DISTRICT OF COLUMBIA, AND WILLIAM C. DURYEA, OF PRINCETON, NEW JERSEY.

RECORDING INDICATOR.

Application filed October 5, 1920. Serial No. 414,742.

*To all whom it may concern:*

Be it known that we, AUGUSTUS TROWBRIDGE, a citizen of the United States of America, residing in the city of Washington, in the District of Columbia, and WILLIAM C. DURYEA, a citizen of the United States, and a resident of the city of Princeton, in the county of Mercer and State of New Jersey, have invented an Improvement in Recording Indicators, of which the following is a specification.

The invention relates to a precision instrument for observing and determining the obscure phenomena of working forces that are not readily appreciated by the unaided human senses.

One of the objects of this invention is to provide an apparatus for research or other work that will produce a visible, and if desired a permanent, record of the extent, duration and time of the variations in working forces or in the relative movement of bodies acted upon thereby. The particular apparatus selected is applicable in research or commercial work to determine variations in fluid pressures and the apparatus is shown as it would be arranged to investigate variations in pressures taking place in an internal combustion engine.

Another object of the invention is to provide a portable indicator that is capable of operation at very high rates of speed and that will accurately indicate all the variations of a working force.

A further object of the invention consists in providing an apparatus that will record and quickly produce a complete and permanent record of the movements of the indicator as it moves at high or low speeds. Other objects of this invention will be apparent in the following description.

A selected embodiment of the invention is shown in the accompanying drawings, wherein—

Figure 1 is a general view of the recording indicator as attached to an internal combustion engine;

Figure 4 is a top plan view of Fig. 3 partially in section and on a slightly reduced scale.

Figure 5 is a side view of the supporting block.

Figure 6 is an end view of part of a galvanometer showing a spoked phonic wheel, a tuning fork, and the apparatus for operating the same;

Figure 7 is a diagrammatic illustration of the electrical connections between a motor driving the phonic wheel and the tuning fork;

Figures 8 and 9 are diagrammatic views of the beam of light as passing from its source to a film in the recorder.

Figure 10 is a view in elevation of the recorder or camera;

Figure 11 is a detailed view of one of the adjustable power transmitting parts of the recorder;

Figure 12 is a view in elevation of another side of the recorder;

Figure 13 is a detail of part of the apparatus in Fig. 12 shown in a second operating position;

Figure 14 is a top plan view of the recorder;

Figures 15 and 16 are views of part of the apparatus shown in Figs. 12 and 13 in different operating positions;

Figure 17 is a sectional view of the recorder;

Figure 18 is a front view of a cutter mounted in the recorder;

Figure 19 is a diagrammatic view of a curve recorded by this apparatus compared with a pressure curve; and Figure 20 is a facsimile of the record produced by the recorder.

Figure 3:
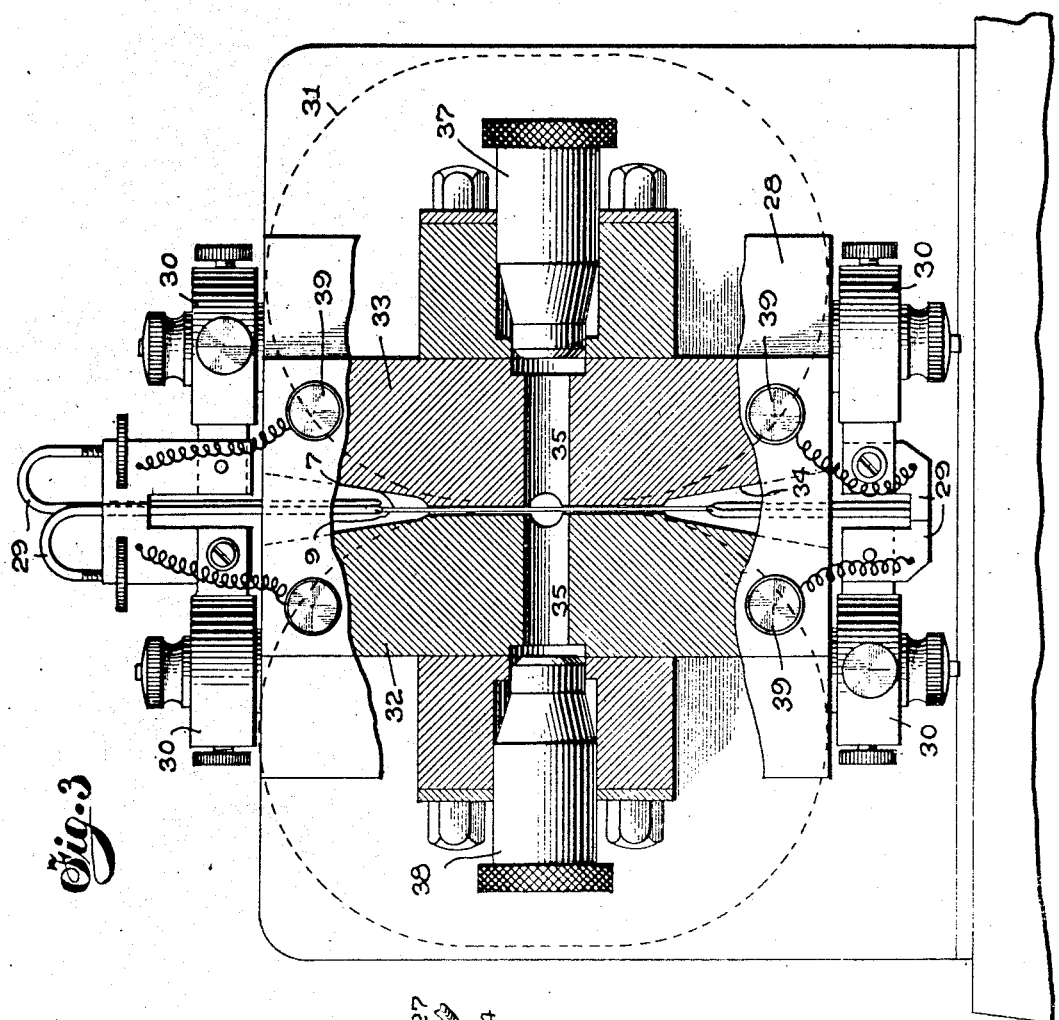
Figure 3 is a view partially in section of the end of a magnet and of a wire supporting block.

The features of the invention and the cooperation of the parts of the apparatus will be described in connection with the investigation of the gas pressures in a high speed internal combustion engine. The instrument selected for this application is provided with a recording means capable of making a complete and permanent record of the operations of the engine when rotated at various speeds and especially at its maximum speed. The apparatus may also be used to investigate relative movements of mechanical elements subjected to variable working forces. The instrument will be hereinafter referred to as an indicating recorder.

Referring to the drawings and particularly to Fig. 1, the apparatus is illustrated as comprising an indicator 1 adapted to be attached to a moving object or in contact with fluids under pressure, a galvanometer 2 electrically connected to the indicator, and a recording apparatus, as camera 3, for recording on a tape, such as a sensitized paper or film 4, the movements of parts of the galvanometer. For purposes of brevity and convenience, the movements of the diaphragm by pressure will be understood as also being capable of movement by means of a moving mechanical element and the recording sensitized paper will be hereinafter referred to as the film and it is intended to include under this term all sensitized tapes which pass through the camera to receive certain indications.

The application of the recording indicator to an internal combustion engine is shown in Fig. 1 where the indicator 1 is positioned in a suitable pet cock or spark plug opening in a cylinder 5. This indicator is preferably provided with a moving member such as a diaphragm 6 adapted to be suitably mounted so that it may vibrate in its forced period of vibration. An electrical apparatus is associated with the diaphragm and is operated by the movement thereof to generate electrical energy which is conducted by suitable means to a small wire 7 (Fig. 3) positioned in a magnetic field. The galvanometer part of the apparatus consists of means for holding the vibrating wire, a suitable light source such as lamp 8 for illuminating the wire, and lenses for focusing the beam of light on the film 4 (Fig. 9) carried in the camera. The shadow formed in the beam of light by the wire will be projected upon the film and the movements of the wire by reason of electrical energy passing therethrough when the wire is under the influence of electromagnetic lines of force will cause the wire to vibrate and, therefore, the shadow to move across the film. A second vibrating wire 9 is mounted by the side of the first one and is moved at intervals by electrical energy supplied from a suitable source, such as a battery, when the closing of a switch operated by the nub 10 suitably mounted on the crank shaft of the engine completes the circuit. The record on the film of the second vibrating wire indicates the position of the crank shaft at the time events occur in the cycle of operation of the engine.

Figure 2:
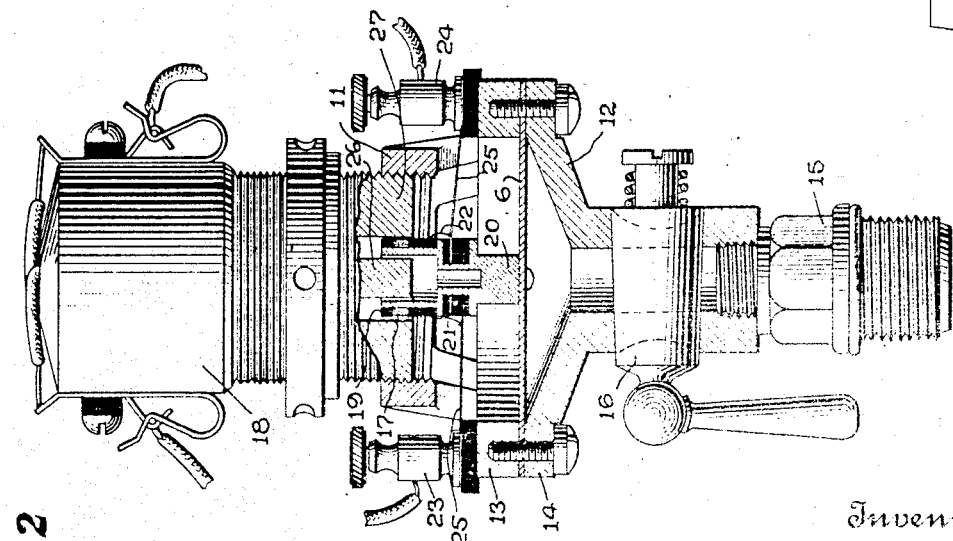
Figure 2 is a view partially in section of the indicating part of the recorder.

Describing the apparatus more in detail, reference is first made to Fig. 2 where the indicator is illustrated on a larger scale and partly in section. This indicator preferably consists of a frame having upper and lower parts 11 and 12 respectively which are provided with flanges 13 and 14 for firmly holding the diaphragm. This type of construction of the indicator provides for the substitution of diaphragms having greater or less flexibility thus permitting flexibility of use of the recording indicator. An attachment 15 is affixed to the lower part of the indicator for fastening the indicator in a spark plug or pet cock opening. The lower part of the frame is provided with a valve 16 for opening the passageway between the diaphragm and the engine cylinder.

The electrical apparatus carried in the indicator for developing electromotive force preferably consists of a coil 17 moved by the diaphragm, and a magnet 18 having its core in proximity to the coil so that movements of the diaphragm will cause the coil to cut magnetic lines of force. The coil is preferably mounted in an annular depression in an insulator 19 carried on a standard 20 which is firmly attached to the diaphragm. This coil is provided with lead wires 21 and 22 extending therefrom to binding posts 23 and 24 mounted on the flange 13 and suitable connections attached to these posts are provided for the transmission of the electrical energy to the vibrating wire 7. The lead wires 21 and 22 are preferably supported on very thin sheets of material 25 of high flexibility which will not have a dampening effect on the diaphragm. The combination of the coil, insulator, and the standard will, for purposes of convenience and brevity be hereinafter referred to as a bobbin. The upper part of the indicator frame is provided with screw threads which permit of the vertical adjustment of the magnet so that the coil 17 may pass through a magnetic field of greater or less density. Preferably, the ends 26 and 27 of the magnet are annular and concentric with one another so that the inner end 26, which is preferably the north pole, will be received inside the bobbin and within the coil, and the outer end 27 being of bell shape will surround the bobbin. The magnet may be a permanent magnet or may be separately excited, as illustrated in the drawings where it is in circuit with a source of power and a manually operated switch.

The galvanometer part of the apparatus is illustrated in detail in Figs. 3 to 7 inclusive. Referring now to these figures, the vibrating wires 7 and 9 are preferably of very small size in order to reduce their inertia to the smallest degree, so a clear cut indication of their movements may be obtained on the film. Preferably the wires are adjustably supported on a suitable block 28 of U-shape (illustrated in Figs. 3 and 5) by means of supporting pieces 29 held in universally adjusted standards 30 which also permit the wires to be placed under the desired tension. The block 28 is suitably held on the core of a magnet 31 which constitutes part of the galvanometer. One end of the core of this magnet is shown in section in Fig. 3 and consists of poles 32 and 33 which form a passageway 34 between them into which the vibrating wires are moved as the block 28 is positioned on the core (see Figs. 3 and 4). The poles of the magnet are provided with longitudinal openings 35 to permit a beam of light to pass through lenses 36, 37 and 38 to illuminate the vibrating wires. The block is also provided with suitable binding posts 39 for connecting the lead wires 40 from the bobbin, and lead wires 41 from the make and break switch operated by the engine crank shaft.

A suitable means for interrupting the beam of light at definite time intervals is provided by a rotating or phonic wheel 42 having spokes 43 which pass in front of the light to interrupt the same thereby casting shadows which extend completely across the film. Preferably the shadows as recorded on the film by the spokes denote a time interval of one one-hundredth of a second, but this may be varied by changing the speed of the wheel. There is geared to the shaft carrying the spoked wheel a protruding member 44 which partially intercepts the beam of light and forms an indication on the film of the passing of a larger interval of time than is indicated by the spoke shadows.

The spoked wheel is preferably rotated by a suitable constant speed motor 45 operated in synchronism with a tuning fork 46. Referring particularly to Fig. 6, the phonic wheel driving motor 45 is held in a frame 47 which in turn is supported on platform 48 mounted on base 49 of the apparatus, and the tuning fork 46 is firmly held in a yoke 50 attached to the base while the tines of the fork extend between the supporting legs of the platform, as will be noted in Fig. 1. The operation of the tuning fork and the motor will be more readily appreciated by reference to Fig. 7, which is a diagrammatic view of the electrical connections. Electrical power is derived from a suitable source, such as battery 51 and current therefrom passes through a coil 52 mounted between the tines of the tuning fork and through make and break contact 53, through the tuning fork, back to the other side of the battery through lead wire 54. A suitable condenser 55 and resistance 56 are provided to eliminate sparking when contact is broken at contact 53. The function of the coil 52 is to pull the tines of the fork together in a well-known manner and their vibration will throw them so that the make and break contact 53 will open the circuit when the tines move outward. The other connection from the battery leads through the motor field 57, through a resistance 58, to a second make and break contact 59, to one of the tines, and from there through lead wire 54, back to the battery. This second make and break contact is also provided with a condenser 60 and a resistance 61. Both make and break contacts are mounted on posts 62 and are provided with suitable adjustable shafts 63 so that the position of the contacting points may be varied. The hereinabove described phonic wheel provides one means of marking time intervals on the film and it is to be understood that others may be employed.

The beam of light having the shadows therein of the vibrating wires and of the spokes of the phonic wheel, passes from lens 38 in the galvanometer to the reducing or cylindrical lens 64 in the recorder or camera, and on to the film where the movements of the vibrating wires are recorded in relation to the lapses of time and in respect to known conditions of the operating machine.

For purposes of clarity in showing the path of the light, reference is made to Figs. 8 and 9. Referring particularly to Fig. 9, which is a diagrammatic view of the lenses and the beam of light when looking down upon the apparatus, the source of light or lamp 8 is illustrated at the right-hand end of the figure, and the suitable lenses are shown in diagrammatic form. A spoke of the phonic wheel is shown in position between the lamp 8 and lens 36, and the vibrating wires 7 and 9 are shown as located between lenses 37 and 38. The cylindrical or reducing lens is shown at the left-hand end of the figure positioned in front of the sensitized film. The shadows cast by the vibrating wires are shown in dotted lines and the paths of these shadows are obtained by considering the wires as luminous bodies sending light to the sensitized film through lenses 38 and 64. The main function of the cylindrical or reducing lens 64 is illustrated in diagrammatic form in Fig. 8 wherein the beam of light with the shadows formed therein enters the recorder or camera through aperture 65 and passes beyond oscillating plates 66 and 67 to the lens 64 which converges the same to a point on the sensitized film 4.

Referring now to the recording or camera part of the recording indicator, a suitable apparatus for making a permanent record of the movements of the vibrating wires will be hereinafter described, but this recorder may be used for other purposes and in connection with other apparatus. For purposes of brevity the recorder will be hereinafter referred to as a camera.

Referring to Fig. 10, the camera preferably consists of a tank 68 mounted on the base 49, a light-proof container 69 for carrying the operating parts of the apparatus, and a film magazine 70, suitably positioned on top of the container. Power is supplied to the apparatus by means of a motor (not shown) through a belt 71 operating on pulley 72 for driving a main shaft 73. A fly wheel 74 operated by the main shaft through a series of gears maintains the moving parts of the apparatus at uniform speeds. Referring also to Fig. 10, there is shown a suitable off-center arrangement for transmitting power at a reduced speed to a set of rollers located in the lower part of the container and preferably consists of a rotating blank wheel 75 driven by gears operated from the main shaft, levers 76 and 77 adjustably positioned off center on the blank by means of a movable quadrant 78, and a toothed wheel 79 mounted on a shaft 80 carrying one of the rollers driven by the levers 76 and 77 operating through engaging pawls 81 and 82, as shown in detail in Fig. 11. The two levers carrying the pawls 81 and 82 are mounted on the shaft 80 and are free to be oscillated about that shaft, thus the movements of the levers 76 and 77 are independent and the two levers that carry the pawls are likewise independent and separately movable. From the description of the foregoing apparatus it will be readily seen that the speed of the roller may be increased or decreased by moving the pivoted ends of the levers away from or toward the center of the blank wheel 75.

Referring to Fig. 12, the apparatus mounted on the opposite outside surface of the container 69 consists of a main operating handle 83 for throwing the operating parts of the camera into and out of operation, a wheel 84 slidably carried on the shaft 85 which also carries one of the driving rollers for moving the film, and pivoted levers which operate with the movement of the operating handle to throw certain parts of the apparatus into operating position. Suitable pulleys 86 and 87 connected by a belt 88 transmit power to a guiding roller 130 (see Fig. 17) which assists in moving the film through suitable developer and fixing baths. A handle 89 is provided to manually rotate the guiding roller when desired.

Referring particularly to Figs. 14 to 17 inclusive, a description of the operation of the camera will be made while following the path of the film through the camera. A door 90 pivoted on the container 69 is opened and the film drawn from the magazine down across an oscillating spring biased guide 91 and into contact with a driving roller 92. The operating handle is then moved to its "up" position moving a second driving roller 93 against the film thereby firmly engaging the same between the rollers which in normal operation draw it from the magazine. The apparatus for moving this second driving roller preferably consists of a suitable cam 94 (see Fig. 13) mounted on the hub of the operating handle for moving a lever 95 backward to rotate shaft 96 carrying lever 97 upon which the roller is mounted. After the film is properly threaded between the driving rollers, the door is closed and a guard 98 surrounding the lens 64 mounted in the door moves its velvet covered edges into contact with the film and presses the same against the guide 91 thus making the enclosure between the door and the interior of the container light-proof. A second guard 99 held on the front of the door carries the oscillating plates 66 and 67 which are movable by thumb screw 100 (see Fig. 14) to increase or decrease the width of the light beam admitted to the lens 64. Preferably these plates are adjusted so that the width of the opening is less than the shadow cast by the spokes of the phonic wheel.

The movement of the operating handle to its "up" position oscillates an apertured cylinder 101 mounted in a cylindrical tapering seat in a second apertured cylinder 102 (see Fig. 17) so that apertures 103 and 104 register and permit the film as moved by the driving rollers to pass therethrough into contact with a guiding fork 105 shown in its lower or "down" position in dotted lines. This fork guides the end of the film from the driving rollers to a second set of rollers 106 and 107, and is maintained in its lower position until the film is caught by these lower rollers, when it is automatically thrown to its "up" position, represented in full lines, and the film is then allowed to double back on itself, as shown in full lines, and to be stored within the container until the lower rollers draw the same forward and move it through developer and fixing liquids maintained in the tank. Proper guiding means such as a V-shaped guide 108 is held in the tank 68 to guide the film through the developing fluids. From the above description it will be noted that the camera exposes the film at one rate of speed and develops it at another rate, this last rate of speed being variable by means of the apparatus above described.

Referring now to Figs. 12, 13, 15 and 16, the operation of the guiding fork and its mechanism will be set forth. Preferably this guiding fork is thrown to its "down" position by the upward movement of the operating handle, and is automatically moved to its "up" position after the power has been applied to the camera for a definite period of time. The mechanism required to move the fork to its "down" position preferably consists of a train of levers 109, 110, 111 and 112 and wheel 84. The upward movement of the handle carries lever 109 upward and a leaf spring 113 attached to the lever rotates the second lever 110 on its shaft 114 and pulls down lever 111 which, being attached to the end of the fourth lever 112, rotates the same about its pivot 131, and moves its free end upward and out of contact with the side of wheel 84. The fork is mounted on shaft 114. The wheel 84 is mounted on shaft 85 carrying one of the driving rollers and is biased by a compression spring 115 to a position near the side of the container. This wheel has on the end of its hub a cam 116 which engages a pin 117 carried in the shaft. The end of the fourth lever engages the top or circumferential surface of the wheel when the fork has been moved to its "down" position, and the levers are in positions shown in Figs. 12 and 16. When the power is applied, pin 117 moves in contact with the cam forcing the wheel outward and compressing spring 115 until the pin reaches the end of the cam at that instant the fourth lever has moved out of contact with the circumferential surface of wheel 84 and is thrown by spring 118 against the hub of the wheel and into contact with the side thereof to maintain the same in its outer position. The spring 118 mounted on the pivot of the fourth lever is of sufficient strength to throw the other attached levers and consequently the fork is rotated to its "up" position, as shown in full lines in Fig. 17. The positions of the levers after being moved are shown in Figs. 13 and 15. When the fork is in "up" position the film is permitted to double back on itself between guides 119 and is later drawn between the lower rollers and moved into the developing fluids.

When the operating handle is moved to its "down" position to stop the movement of the paper by moving the second driving roller out of contact with the first one, a sharp edge 120 formed at an angle to the center line of the apertured cylinder 101 (see Fig. 18) is progressively moved against the other apertured cylinder 102 to cut the film. The remaining parts of the apparatus continue to operate until the lower rollers have moved the film held in storage through the developer and fixing baths and the guiding rollers 130 has moved the film from the developer solution.

Referring now to Fig. 20, which represents the permanent film as it issues from the camera, the movements of the diaphragm of the indicator are shown as recorded on the film. The lines extending across the film represent the shadows cast by the spokes of the phonic wheel and, as hereinbefore stated, indicate time intervals of one one-hundredth of a second. The middle or upper line illustrates the movement of the diaphragm in the indicator and since it is responsive to the pressure in the engine this curve represents the actual pressure variations in the cylinder during the cycle of operation of the engine. The portion of the curve between the points 121 and 122 indicates the pressure variation in the cylinder during a compression stroke of the engine, and the expansion thereof without the firing or burning of the gases is shown next to the right. The induction or suction stroke of the engine is illustrated at point 123 and a second compression stroke is illustrated at 124 and the firing of the gases takes place at 125 which is just prior to the completion of the upward movement of the piston. The pressure variation during the burning of the gases in the cylinder is represented by the wide movement in the curve in this figure and the operation of the exhaust valve is shown as commencing at the point 126.

The lower curve illustrates the movements of the second vibrating wire 9 and shows the passing of current through that wire by means of the operation of the switch associated with the crank shaft in the engine. Since the position of nub 10 on the crank shaft to close this switch is known with respect to the position of the piston in cylinder 5, the time of the firing of the gases and the movements of the inlet and exhaust valves in respect to the engine shaft are readily determined. The distance of any part of the curve from its normal indicates the variation of the intensity of the gas pressures in the cylinders. It is well understood in the electrical art that the movement of a coil through magnetic lines of force will generate an electromotive force in the coil. It is also known that when a coil under the influence of a magnet is moved by an oscillating member, such as a diaphragm, that the maximum electromotive force in the coil is generated during the highest speed of movement of the diaphragm, and that when the diaphragm has been moved to its furthest point from its normal position, there is the status that the coil is at rest for an instant before it starts in the reverse direction and that no lines of force are being cut and that there is maximum pressure against the under side of the diaphragm. Consequently, in referring to Fig. 19, the point 127 on a known pressure curve, which indicates the maximum pressure of the gas in the cylinder, is directly above the point on the curve on the film where it crosses the abscissa, that is, there is no movement of the coil to cut magnetic lines of force. As the pressure is reduced in the engine, due to the downward movement of the piston, the diaphragm moves back to normal position and in doing so cuts magnetic lines of force generating electromotive force the intensity of which is indicated by the part of the curve extending below the abscissa. The ordinate of the pressure curve 128 is represented by P and the abscissa by T for the time. The lower curve 129 in the figure being developed by the herein described recording indicator represents increment changes in pressures during increments of time, and therefore the ordinate represents $$\frac{dp}{dt},$$

showing the extent of the increament changes, The abscissa of this curve represents time. The curves represented in Fig. 19 are those of pressures of gases in a gas engine cylinder during the compression and expansion strokes without the gases being ignited, the top curve representing the actual pressure and the lower curve representing pressure variations obtained by the recording indicator.

The indications of the conditions of the gases in the cylinder indicated by the curves on the film may be interpolated to determine the exact intensities in pounds per square inch and the time of duration of these pressures; and the variations in pressures during the compression of the gases may be determined from the small vibrations in the curve. The position of the piston in the cylinder as related to the crank shaft is determined by the position of the indication of the lower curve.

The foregoing description of the apparatus and the operation of the recording indicator is directed to the variations in pressures of a single cylinder and to the relation of these pressures to the position of the piston. It is to be understood that the carrying block 28 may be increased in size and that several vibrating wires from several different cylinders may be held therein and their indications represented on the film 4 as described. If desired, the film may be of greater width to accommodate the operation of several additional vibrating wires, but this would necessitate only a change in degree of the apparatus herein described.

The subject matter of the camera portion of this application has been claimed in a copending application entitled Cameras, filed January 30, 1922, S. N. 532,591.

This invention may be variously embodied and the particular embodiment shown may be modified within the scope of the subjoined claims.

We claim:

1. In an indicator the combination of a member movable at high speeds and adapted to be responsive to minute variations in the moving force, and electrical conducting means moved by said member and being so arranged in a magnetic circuit that an electromotive force will be generated in said conducting means during its movement, the intensity of said electromotive force being in proportionate relation to the intensity of the force moving said member, an indicating means influenced by the generated electromotive force, and means for recording the indications made by said indicating means.

2. In a recording indicator the combination of a member movable at high speeds, an electrical conducting coil positioned in a magnetic field and moved by said member, and a small wire of low inertia electrically connected to said electrical coil and movable in a magnetic field, and means for recording the movements of said wire.

3. In a recording indicator the combination of a member movable at high speeds, an electrical conducting coil juxtaposed to said member and held in a magneitc field, and a wire connected to said coil and held in another magnetic field and movable when electrical energy passes therethrough, and means for recording the movements of said wire.

4. In a recording indicator the combination of a member movable at high speeds, an electrical coil movable with said member, a magnet having its poles within and around said coil, a small conducting wire held in a magnetic field and connected to said coil, and means for recording the movements of said wire as electrical energy formed in said electric coil by its movements in the magnetic field passes through said wire.

5. In an apparatus as described the combination of a mechanically moving member, an electrical means associated with said member and adapted to generate electromotive force when moved by said member, an electrical conducting wire of low inertia connected to said electrical means and positioned within a magnetic field, said wire being capable of movement from its normal position as the electromotive force passes through it, and means for recording the movements of said wire.

6. In a recording indicator, the combination of a diaphragm of rapid free period of vibration movable at high speeds, an electrical coil moved by said diaphragm, a magnet creating magnetic lines of force in the path of said coil, a wire of small inertia held in a magnetic field and electrically connected to said coil to receive electromotive force generated therein, and means for recording the movements of said wire.

7. In a recording indicator the combination of a member movable at high speeds and arranged to be responsive to minute variations in the force which moves said member, an electrical conductor so positioned in a magnetic circuit that movements of said conductor due to a mechanical connection between it and said movable member will cause the generation of electromotive force in said conductor, an electroresponsive means connected to said conductor for indicating the electromotive force generated, the indications being in proportion to the intensity of the force moving said member, means for projecting the movement of said electroresponsive means, and a moving sensitized film for receiving the projections.

8. In a recording indicator the combination of a member movable at high speeds, electrical means associated with said member having a small wire movable in known relation therewith, a light projecting means for projecting the movements of said wire, and a rapidly moving sensitized film exposed to said light for recording said projections.

9. In a recording indicator the combination of a member movable at high speeds, electrical generating means associated with said member, a small wire remotely placed and connected to said electrical means and responsive to energy generated therein, a light projecting means for projecting the movements of said wire, a rapidly moving sensitized film for receiving the projections and for recording said projections, and means for indicating time elements on said film.

10. In a recording indicator the combination of a diaphragm movable at high speeds, electrical means associated with said diaphragm and adapted to generate electrical energy, means for indicating the intensity and duration of said energy, and a light projecting means for projecting the indications, a sensitized film for receiving said projections, and means for indicating time intervals on said film.

11. In a recording indicator, the combination of a diaphragm movable at high speeds, an electrical coil associated therewith, a magnet for producing a magnetic field around said coil, a small wire connected to said coil and influenced by a second magnetic field, a light beam illuminating said wire, a sensitized film for receiving said beam of light and the shadow cast by said wire, and means for indicating on said paper intervals of time.

12. In a recording indicator the combination of a diaphragm movable at high speeds, a magnet positioned near said diaphragm, an electrical coil movable by said diaphragm and in the field of said magnet for generating electrical energy, a wire held in another magnetic field and connected to said coil and adapted to be variably moved from its normal position by the intensity of the energy generated in said coil, light means illuminating said wire, a sensitized film for recording the positions of said wire, and means for indicating on said film the passing of intervals of time.

13. In a recording indicator the combination of an induction coil capable of rapid movement in a magnetic field, a wire connected to said coil and positioned in another magnetic field, and means for recording the movement of said wire.

14. In a recording apparatus the combination of a rapidly moving member, mechanical means attached to said member for transmitting the movements thereof, an electrical generating means associated with and operated by said mechanical means, a movable indicator connected with said generating means and responsive in degree to the amount of energy generated, and means for recording the movements of said indicator.

15. In a recording indicator the combination of a flexible diaphragm responsive to pressures in an internal combustion engine, an electrical coil carried by said diaphragm and movable in a magnetic field, a vibrating member also movable in a magnetic field and electrically connected to said coil and adapted to vibrate in proportion to the electromotive force developed in said coil, lighting means for illuminating said vibrating member, and a sensitized film in the path of said light.

16. In a recording indicator the combination of a flexible diaphragm responsive to pressures in an internal combustion engine, an electrical coil carried by said diaphragm and movable in a magnetic field, a vibrating member also movable in a magnetic field and electrically connected to said coil and adapted to vibrate in proportion to the electromotive force developed in said coil, lighting means for illuminating said vibrating member, and a rapidly moving sensitized film exposed to a light beam from said lighting means, the positions of the shadow cast by said vibrating member in said light beam indicating the positions of said diaphragm.

17. In a recording indicator the combination of a movable diaphragm responsive to the varying pressures in a cylinder of an internal combustion engine, an induction coil carried by said diaphragm and movable in an adjustably positioned magnetic field, a magnetically influenced vibrating wire connected to said induction coil and movable in proportion to electromotive force developed in said coil, a beam of light for illuminating said wire, and a rapidly moving sensitized film in the path of said light for recording the position of said wire in said beam of light.

18. In a recording indicator the combination of an indicator attached to an internal combustion engine, a magnetically influenced vibrating wire electrically connected to said indicator and moved by the electromotive force generated therein, a second vibrating wire electrically connected to a source of power and to a switch operated by the shaft of said internal combustion engine, said second wire held near said first vibrating wire and subject to the same magnetic influence, a beam of light for illuminating said wires, and a rapidly moving sensitized film in the path of said light for recording the positions of the shadows created by said wires.

19. A recording indicator comprising a diaphragm moved by the varying gas pressures in an internal combustion engine, an electrical coil carrying bobbin attached to said diaphragm and movable therewith, a magnet having one part of its core held within said coil and another part surrounding the outside thereof, means for exciting said magnet, a fine wire electrically connected to said coil and adjustably positioned between two parts of a core of a second magnet to be moved by the influence of electric energy passing therethrough and by the magnetic forces created by the second magnet, a source of light for projecting light beams through lens and on to said wire, a spoked wheel rotating at uniform speed by means of a motor rotating in synchronism with an electrically operating tuning fork for interrupting said beams of light at definite time intervals, a camera having a uniformly moved sensitized film passing in front of an aperture provided with a condensing lens and adapted to have said light beams projected thereon to indicate the positions of said wire and said spokes as said wire and said spokes are moved in the path of said light beams, and rollers for moving said sensitized film to developer and fixing baths at a speed different from its speed in front of said aperture.

20. A recording indicator comprising a diaphragm moved by the varying gas pressures in an internal combustion engine, a bobbin carrying an electrical coil attached to said diaphragm and movable therewith, a magnet having one part of its core held within said coil and another part surrounding the outside thereof, means for exciting said magnet, a fine wire electrically connected to said coil and adjustably positioned between two parts of a core of a second magnet to be moved by the influence of electric energy passing therethrough and by the forces created by the second magnet, a second vibrating wire electrically connected to a source of power and to a switch operated by the shaft of said internal combustion engine, said second wire held near said first vibrating wire and subject to the same magnetic influence, a source of light for projecting light beams through lens and on to said wires, a spoked wheel rotating at uniform speed by means of a motor rotating in synchronism with an electrically operating tuning fork for interrupting said beams of light at definite time intervals, a camera having a sensitized film passing at a uniform speed in front of an aperture provided with a condensing lens and adapted to have said light beams projected thereon to indicate the posititons of said wires and said spokes as said wires and said spokes are moved in the path of said light beams, and rollers for moving said sensitized film to developer and fixing baths at a speed different from the speed in passing said aperture.

21. In a recording indicator having an indicator part comprising a diaphragm adapted to be rapidly moved, a bobbin carrying an electric coil and being firmly attached to said diaphragm, and an adjustably positioned magnet for producing a magnetic field around said coil to generate electromotive force in said coil as it moves in said magnetic field.

22. In a recording indicator having an indicator part comprising a diaphragm movable in response to varying pressure, a bobbin carrying an electric coil attached to said diaphragm and movable therewith, a separately excited magnet for producing a magnetic field around said bobbin, and means for conducting electromotive force generated in said coil by its movement in said magnetic field to a remote point.

23. In a recording indicator having an indicator part comprising a frame, a diaphragm of rapid free period of vibration held therein and adapted to be readily moved, a bobbin attached to said diaphragm and carrying an electrical coil, a magnet positioned in said frame and having part of its core held within said coil and another part of its core held on the outside of said coil, and means for holding said magnet in several positions to have greater or less magnetic lines of force cut by said coil during its movement with said diaphragm.

24. In a recording indicator having an indicator part comprising a frame, a vibrating diaphragm positively held in said frame, a tubular opening in the lower part of said frame provided with means for attaching the same to an internal combustion engine, a valve in said tubular opening to admit gases under pressure from said engine to one side of said diaphragm, a standard firmly attached to the center of said diaphragm and movable therewith, an insulating member carried on said standard, a coil wound on said insulating member and having leads extending to binding posts held on said frame, a separately excited magnet adjustably held in said frame and having one of its poles adapted to enter said standard and to be held within said coil and having its other pole of circular shape surrounding said insulating member and said coil, and means for separately exciting said magnet.

25. In an electrical instrument a magnet for creating a magnetic field, and an electrical conductor held in said field and adapted to be vibrated by an external force thereby generating an electromotive force in said conductor, the pole pieces of said magnet being arranged to be moved at will relatively to said conductor to produce a variation in the effectiveness of said magnetic field on said conductor thereby effecting the amount of electromotive force generated when said conductor is moved.

26. In an electrical instrument an electromagnet having a closed magnetic circuit except for a small air gap, and a coil of electrically conductive material normally suspended in said air gap and adapted to be free to move therein, said magnet and said coil being so arranged that one of them may be materially moved relatively to the other to change the effectiveness on said coil of the magnetic field created by said magnet.

27. In an electrical instrument an electromagnet having a closed magnetic circuit except for a small air gap, a coil adapted to be suspended in said air gap and arranged to have free movement therein, and means for moving said coil within the magnetic field created by said magnet to generate an electromotive force, said magnet adapted to have its pole pieces movable relatively to said coil to increase or decrease the intensity of the magnetic field in which said coil moves thus varying the amount of the electromotive force generated.

28. In a recording indicator a member adapted to be moved at high speeds, a small coil mounted on a means attached to said member so that said coil is moved in unison with said member, an electromagnet so constructed as to have a small annular air gap and being so positioned in relation to said member and said coil as to have said coil suspended in said air gap, the movement of said coil in a magnetic field created by said magnet causing the generation of an electromotive force in said coil, said magnet adapted to be moved to and from said coil to vary the intensity of the magnetic field in which said coil moves thereby varying the amount of the electromotive force generated, means for positively holding said magnet in its various positions, and an indicating means operated by the electromotive force generated in said coil to show the intensity of movement of said member.

In testimony whereof, we have signed our names to this specification this first day of October, 1920.

AUGUSTUS TROWBRIDGE.
WILLIAM C. DURYEA.